United States Patent
Townsend, Jr.

(10) Patent No.: US 9,458,974 B2
(45) Date of Patent: Oct. 4, 2016

(54) FLEXIBLE MOMENT CONNECTION DEVICE FOR MAST ARM SIGNAL MOUNTING

(71) Applicant: Robert E. Townsend, Jr., Lake Wales, FL (US)

(72) Inventor: Robert E. Townsend, Jr., Lake Wales, FL (US)

( * ) Notice: Subject to any disclaimer, the term of this patent is extended or adjusted under 35 U.S.C. 154(b) by 0 days.

(21) Appl. No.: 14/514,135

(22) Filed: Oct. 14, 2014

(65) Prior Publication Data

US 2015/0354766 A1 Dec. 10, 2015

Related U.S. Application Data

(63) Continuation-in-part of application No. 14/496,668, filed on Sep. 25, 2014, now Pat. No. 8,985,535.

(60) Provisional application No. 62/009,258, filed on Jun. 8, 2014, provisional application No. 62/038,399, filed on Aug. 18, 2014.

(51) Int. Cl.
| | |
|---|---|
| *A47B 96/06* | (2006.01) |
| *A47G 29/00* | (2006.01) |
| *E04G 3/00* | (2006.01) |
| *A47K 1/00* | (2006.01) |
| *F21S 8/08* | (2006.01) |
| *E04H 12/18* | (2006.01) |
| *F21V 21/116* | (2006.01) |
| *F16M 13/02* | (2006.01) |
| *G08G 1/095* | (2006.01) |
| *F21W 111/02* | (2006.01) |
| *G08G 1/01* | (2006.01) |

(52) U.S. Cl.
CPC ............. *F21S 8/085* (2013.01); *E04H 12/18* (2013.01); *F16M 13/022* (2013.01); *F21V 21/116* (2013.01); *G08G 1/095* (2013.01); *F21W 2111/02* (2013.01); *G08G 1/01* (2013.01); *Y10T 29/49828* (2015.01)

(58) Field of Classification Search
CPC .......... E01F 9/00; F16M 13/022; F16B 2/00; G08G 1/095; F21S 8/085
See application file for complete search history.

(56) References Cited

U.S. PATENT DOCUMENTS

| | | |
|---|---|---|
| 1,985,951 A | 1/1935 | Richterkessing |
| 2,038,117 A | 4/1936 | Layton |
| 2,195,041 A | 3/1940 | Von Schlippe |
| 2,942,366 A | 6/1960 | Pfaff, Jr. et al. |
| 3,033,318 A | 5/1962 | Jewell |

(Continued)

FOREIGN PATENT DOCUMENTS

EP 2 653 072 A2 10/2013

*Primary Examiner* — Amy Sterling
(74) *Attorney, Agent, or Firm* — Brinks Gilson & Lione (57) ABSTRACT

An attachment assembly and a method for mounting a traffic control device to a mast arm are provided. The attachment assembly includes an attachment device. The attachment device includes a first portion operably connect to the mast arm so that a first surface of the first portion is oriented toward the mast arm, a second portion extending substantially parallel to the first portion along at least a portion of a first length, a second surface of the second portion is oriented toward the traffic control device, and a third portion having a third length and extending between the first portion and the second portion so that a gap is formed between a second face of the first portion and a first face of the second portion that allows the attachment device to flex when the traffic control device is mounted to the mast arm.

20 Claims, 11 Drawing Sheets (56) References Cited

U.S. PATENT DOCUMENTS

| | | |
|---|---|---|
| 3,142,501 A | 7/1964 | Clark et al. |
| 3,612,222 A | 10/1971 | Minor |
| 3,888,446 A | 6/1975 | O'Brien et al. |
| 3,891,175 A | 6/1975 | Hawley et al. |
| 3,917,205 A * | 11/1975 | Meadors .............. G08G 1/095 248/229.17 |
| 3,977,641 A | 8/1976 | Garchinsky |
| 4,010,925 A | 3/1977 | Garchinsky |
| 4,167,033 A | 9/1979 | Fletcher |
| 4,659,046 A | 4/1987 | Parduhn |
| 4,860,985 A | 8/1989 | Olson et al. |
| 4,917,338 A * | 4/1990 | Olson .................. F21V 21/116 248/214 |
| 5,340,069 A | 8/1994 | Niemeyer |
| 5,645,255 A * | 7/1997 | Parduhn ............... E01F 9/0118 248/214 |
| 6,357,709 B1 | 3/2002 | Parduhn |
| 7,997,546 B1 * | 8/2011 | Andersen ................ F16B 2/06 248/214 |
| 8,985,535 B1 * | 3/2015 | Townsend, Jr. ...... F16M 13/022 248/214 |
| 9,200,654 B1 * | 12/2015 | Parduhn ............... F16B 7/0493 |
| 2011/0193277 A1 | 8/2011 | Christenson |
| 2012/0040498 A1 | 2/2012 | Youn et al. |

* cited by examiner

FLEXIBLE MOMENT CONNECTION DEVICE FOR MAST ARM SIGNAL MOUNTING

RELATED APPLICATIONS

This application is a continuation-in-part of U.S. application Ser. No. 14/496,668 filed Sep. 25, 2014 and claims the benefit of the filing date under 35 U.S.C. §119(e) of Provisional U.S. Application Ser. No. 62/009,258, filed Jun. 8, 2014, and Provisional U.S. Application Ser. No. 62/038,399, filed Aug. 18, 2014, which are hereby incorporated by reference.

FIELD OF THE INVENTION

The present invention relates generally to the field of traffic control devices and in particular to mast arm support structures and traffic control devices each susceptible to dynamic wind loads that may damage the connection between the horizontal and vertical mast arm support structure and between the traffic control device and the mast arm and to flexible mounting assemblies for mounting traffic control devices to mast arms.

BACKGROUND

Roadway intersections, when warranted, require signalization to maintain safety and efficient movement of vehicular traffic. Traffic control devices (signals, signs, cameras, etc.) are generally supported on roadside posts, suspended from span wires or rigidly mounted on steel mast arms cantilevered over the roadway from a vertical pole that is designed as a rigid structure.

Steel mast arm traffic signal support structures are typically rigidly designed to resist high wind loads imparted to the poles and mast arms. The current design concerns (moments) are only directed now to the base of the pole and to the connection of the mast arm to the pole. In addition, the current designs use a rigid connection including drilled and tapped cast aluminum connections to connect the traffic signal to the mast arm. Common prior art cable securements rely on single in-plane surface plate to cable pressures and non-consistent, unpredictable use of acute cable angles.

What is needed in the art is an attachment device and an attachment assembly for connecting a traffic control device to a mast arm that provides a flexible connection for connecting the traffic control device to the mast arm. In some aspects, using cables to secure the traffic control device to the mast arm, an assembly including multiplane surface-cable pressures and that provides for consistent use of acute cable angles is needed.

BRIEF SUMMARY

It is an object of the present invention to provide a device and a method having features that resolve or improve on rigid connection devices connecting traffic control devices to mast arms. In some embodiments, the devices and methods provided herein minimize the effects of structural fatigue vibrations.

In one aspect, an attachment assembly for mounting a traffic control device to a mast arm is provided. The attachment assembly includes an attachment device. The attachment device includes a first portion having a first length and the first portion includes a plurality of apertures. The first portion is adapted to operably connect to the mast arm so that a first surface of the first portion is oriented toward the mast arm. The attachment device includes a second portion having a second length and the second portion includes a plurality of apertures. The second portion extends substantially parallel to the first portion along at least a portion of the first length. The second portion is adapted to operably connect to the traffic control device so that a second surface of the second portion is oriented toward the traffic control device. The attachment device includes a third portion having a third length and extending between the first portion and the second portion so that a gap is formed between a second face of the first portion and a first face of the second portion that allows the attachment device to flex when the traffic control device is mounted to the mast arm.

In another aspect, an attachment assembly for mounting a traffic control device to a mast arm is provided. The attachment assembly includes a first attachment device and a second attachment device. The first attachment device includes a first portion having a first length and the first portion includes a plurality of apertures. The first portion is adapted to operably connect to the mast arm so that a first surface of the first portion is oriented toward the mast arm. The first attachment device includes a second portion having a second length and the second portion includes a plurality of apertures. The second portion extends substantially parallel to the first portion along at least a portion of the first length. The second portion is adapted to operably connect to the traffic control device so that a second surface of the second portion is oriented toward the traffic control device. The first attachment device includes a third portion having a third length and extending between the first portion and the second portion so that a gap is formed between a second face of the first portion and a first face of the second portion that allows the attachment device to flex when the traffic control device is mounted to the mast arm. The second attachment device has a first surface and a second surface opposite the first surface and the second attachment device is operably connectable to the mast arm.

In another aspect, a method of mounting a traffic control device to a mast arm is provided. The method includes connecting an attachment assembly including a first attachment device to the mast arm. The first attachment device includes a first portion having a first length and the first portion includes a plurality of apertures. The first portion is adapted to operably connect to the mast arm so that a first surface of the first portion is oriented toward the mast arm. The first attachment device includes a second portion having a second length and the second portion includes a plurality of apertures. The second portion extends substantially parallel to the first portion along at least a portion of the first length. The second portion is adapted to operably connect to the traffic control device so that a second surface of the second portion is oriented toward the traffic control device. The first attachment device includes a third portion having a third length and extending between the first portion and the second portion so that a gap is formed between a second face of the first portion and a first face of the second portion that allows the attachment device to flex when the traffic control device is mounted to the mast arm. The second attachment device has a first surface and a second surface opposite the first surface and the second attachment device is operably connectable to the mast arm. The method further includes connecting the traffic signal to the first attachment device.

Advantages of the present disclosure will become more apparent to those skilled in the art from the following description of embodiments that have been shown and described by way of illustration. The invention is capable of other and different embodiments, and its details are capable of modification in various respects. Accordingly, the drawings and description are to be regarded as illustrative in nature and not as restrictive.

DETAILED DESCRIPTION

The invention is described with reference to the drawings in which like elements are referred to by like numerals. The relationship and functioning of the various elements of this invention are better understood by the following detailed description. However, the embodiments of this invention are not limited to the embodiments illustrated in the drawings. It should be understood that the drawings are not to scale, and in certain instances details have been omitted which are not necessary for an understanding of the present invention, such as conventional fabrication and assembly.

In some aspects, the present invention is directed to the improvement of common mast arm rigid traffic control device mounting assemblies that provide a rigid connection between a traffic control device and a mast arm. The present invention addresses the known structural deficiencies of the prior art by providing a flexible mast arm saddle and/or flexible swivel type connection device that is approximately 3-5 times stronger, and not susceptible to cracking due to either wind loading and/or installer failure to torque properly. In addition, the present invention provides a much stronger shear-type connection using through bolting to connect the traffic control device to the mast arm. In some embodiments, the attachment assembly of the present invention can perform as a means to dampen wind induced forces.

Rigidity is the property of a structure that it does not bend or flex under an applied force. The opposite of rigidity is flexibility. In structural rigidity theory, structures are formed by collections of objects that are themselves rigid bodies. A structure is rigid if it cannot flex; that is, if there is no continuous motion of the structure that preserves the shape of its rigid components and the pattern of their connections then the structure becomes susceptible to forces placed upon the structure such as wind induced accelerations.

It is a basic engineering design principle that, if possible, a structure must have features that allow for flexibility, while still maintaining its structural loading requirements such as gravitational and wind induced accelerations. The present invention utilizes the "Flexible Moment Connection", semi-rigid approach. The basic principles of the FMC approach are to treat the beams (saddle & swivel) as simply connected under gravity loads but as moment connected under lateral (wind) loads. The FMC can be basically described as three types of connections: One that exhibits a small amount of rotation with a large amount of moment is noted as a rigid connection (prior art). A second connection that exhibits a large amount of rotation with a small amount of moment is noted as simple. The third connection is noted as a semi-rigid connection and provides some moment restraint while permitting some rotation (present invention). Semi-rigid connections can fall anywhere between simple and rigid. In general, connections capable of resisting at least 90 percent of the beam fixed-end moment are referred to as rigid. Those that offer enough ductility to accommodate beam end rotation while resisting no more than 20 percent of the fixed-end moment are referred to as simple. Any connection that is capable of resisting a moment between these limits while permitting some rotation must be treated as semi-rigid or flexible.

In some embodiments, the attachment assembly of the present invention can respond to both vertical and horizontal oscillations (vibrations) by absorption and/or dampening wind induced structural fatigue vibrations.

When a lateral load (wind) is applied to a mast arm structure, the windward connection of both the mast arm saddle, the swivel plate and sometimes flexible flange (used to replace common tubes) will load in a flexural response in the present invention, therefore resulting in a significant increased wind resistance over the prior art's common rigid saddle, swivel plates, and traffic signal support tubes that have very limited, if any, resiliency. It is better for any structure to have less stress due to elasticity than having to absorb any amount of wind force or wind induced kinetic energy.

An additional benefit of the present invention is that when the swivel plate, and optionally the flexible signal bracket, because of their size relative to the mast arm, unload faster in a direction that is opposite of the wind induced displacement that may be horizontal, vertical or both horizontal and vertical creating a dampening effect helping to reduce the moment stresses that occur at the structure's connection of the horizontal mast to the vertical pole; based upon Newton's second law of motion: Firstly, this law states that if you do place a force on an object, it will accelerate (change its velocity), and it will change its velocity in the direction of the force. So, a force aimed in a positive direction will create a positive change in velocity (a positive acceleration). And a force aimed in a negative direction will create a negative change in velocity (a negative acceleration).

Cantilevered mast arms are susceptible to four types of wind loading that may induce vibrations that can lead to fatigue failures such as vortex shedding, galloping, natural, wind gust and truck-induced wind gust failures.

In another aspect, the present invention avoids galvanic corrosion risk, especially in wet, salty coastal areas with the aluminum and stainless steel in contact with one another, typical to all prior art aluminum castings that are secured with stainless steel fasteners and more importantly stainless steel cables used to secure the entire traffic control device to the mast arm support. In order for galvanic corrosion to occur, three elements are required: 1) Two metals with different corrosion potentials; 2) Direct metal-to-metal electrical contact; and 3) A conductive electrolyte solution (e.g. moisture) must connect the two metals on a regular basis. The electrolyte solution creates a "conductive path" such as when there is regular immersion, condensation, rain, fog exposure or other sources of moisture that dampen and connect the two metals.

In some embodiments, the attachment assembly of the present invention provides a wind resilient and hurricane resistant traffic signal mounting device by providing a much stronger connection to a cantilevered mast arm.

In some embodiments, the attachment assembly of the present invention is directed to improving the survival of mast arm signalization during high wind events by resisting and minimizing the structural failures (cracked castings) known to occur in current—typical rigid cast aluminum traffic signal mounting bracket assemblies.

Ideally, the frequencies and the amplitudes of any dampening device and the structure should nearly match so that every time the wind pushes the mast arm, the dampener(s) create(s) an equal and opposite push on the structure, keeping the displacement of the structure closer to zero. In some embodiments of the present invention, one object is to minimize the initial, smaller displacement that lead to larger amplitudes of oscillation due to greater wind-induced displacement.

In some embodiments, the attachment assembly of the present invention provides additional strength (bending moments) by relocating the tube tensioning connections longitudinally further apart providing an improved fulcrum spacing. In some embodiments, the attachment assembly of the present invention provides compatibility to any current signal head support tube with bracket arms commonly used to hang the traffic control device.

Figure 1:
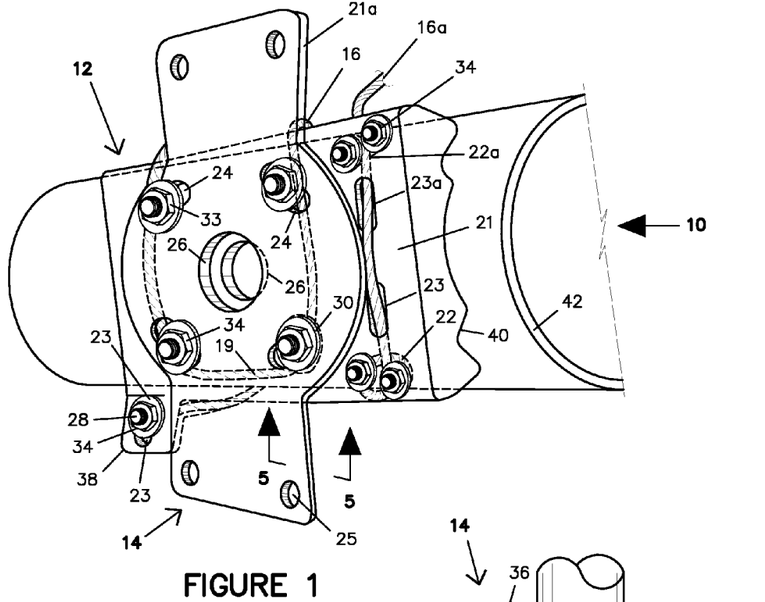
FIG. 1 is a right hand view illustration an embodiment of a mast arm saddle and swivel plate of an attachment assembly in accordance with the present invention.

FIG. 1 represents a right side perspective of an embodiment of an attachment assembly 10 for connecting a traffic control device to a mast arm 42 of a traffic signal support structure. The attachment assembly 10 includes a mast arm saddle or plate 12 and a swivel plate 14. The mast arm saddle 12 and the swivel plate 14 may be provided so that when the assembly 10 is connected to the mast arm 42, one or both of the mast arm saddle 12 and the swivel plate 14 are flexible. A cable 16 operably connects the mast arm saddle 12 to the mast arm 42. A plurality of connectors connects the attachment assembly 10 together as described in more detail below.

In some embodiments, both the mast arm saddle 12 and the swivel plate 14 may be fabricated out of metal, for example, a weather resistant stainless steel plate in a thickness ranging from ⅛" to 5/16" pending upon design criteria based upon different wind zones. Other materials such as flexible engineered plastics may also be desirable in some applications. In some embodiments, combinations of materials may be used. The mast arm saddle 12 and the swivel plate 14 may be fabricated using computer controlled (CNC), laser or water jet cutting. Other methods known to one skilled in the art may also be used to fabricate the mast arm saddle 12 and the swivel plate 14, including, but not limited to stamp and punch pressing. In some embodiments, the mast arm saddle 12 may be first cut out as a flat plate with a plurality of apertures. The apertures may include one or more adjustment slots 23 and a plurality of apertures 25 for receiving fasteners therethrough for connecting the mast arm saddle 12 to the swivel plate 14 (further explained below). The cable 16 may also be threaded through some of the apertures. The mast arm saddle 12 may also include an opening 26 that is sized and shaped to receive wires for electrical connections for the traffic control device.

After cutting the mast arm saddle 12 from the flat plate, one or more mast arm engagement flanges 40 may be cold bent approximately 90° downward from a first surface 13 of the saddle 12. In some embodiments, the engagement flanges 40 may be positioned at opposite ends 19 of the saddle 12. Ends 41 of the engagement flanges 40 may each include a curved portion that is adapted to contact a curved portion of the mast arm 42 when the mast arm saddle 12 is positioned on the mast arm 42, for example, when the mast arm 42 is curved. The ends 41 of the engagement flanges 40 may be configured to have any shape that conforms to the shape of the mast arm 42. In some embodiments, the ends 41 may be angular or straight. In higher wind zones or in the case of lighter mast arm construction (thinner material) it may be desirable to incorporate pads to the mast arm engagement flanges 40 to distribute surface pressures between the mast arm saddle 12 and the mast arm 42. As shown in FIG. 4, the ends 41 of the engagement flanges 40 contact the mast arm 42 and the first surface 13 of the mast arm saddle 12 faces the mast arm 42. The first surface 13 of the mast arm saddle 12 is spaced apart from the mast arm 42 such that a gap 65 exists between the mast arm saddle 12 and the mast arm 42 to accommodate flexing of the mast arm saddle 12. In some embodiments, the engagement flange 40 may be positioned other than at the opposite ends 19 of the mast arm saddle 12. By way of non-limiting example, one or more engagement flanges 40 may be positioned away from the ends 19 of the mast arm saddle 12 at a central position or offset from the center. Additionally, in some embodiments, an acute angle connection flange 38 may be cold bent approximately 10° to 20° upward from a second surface 15 of the saddle 12 pending final design criteria as shown in FIGS. 1, 3A and 3B.

Figure 3A:
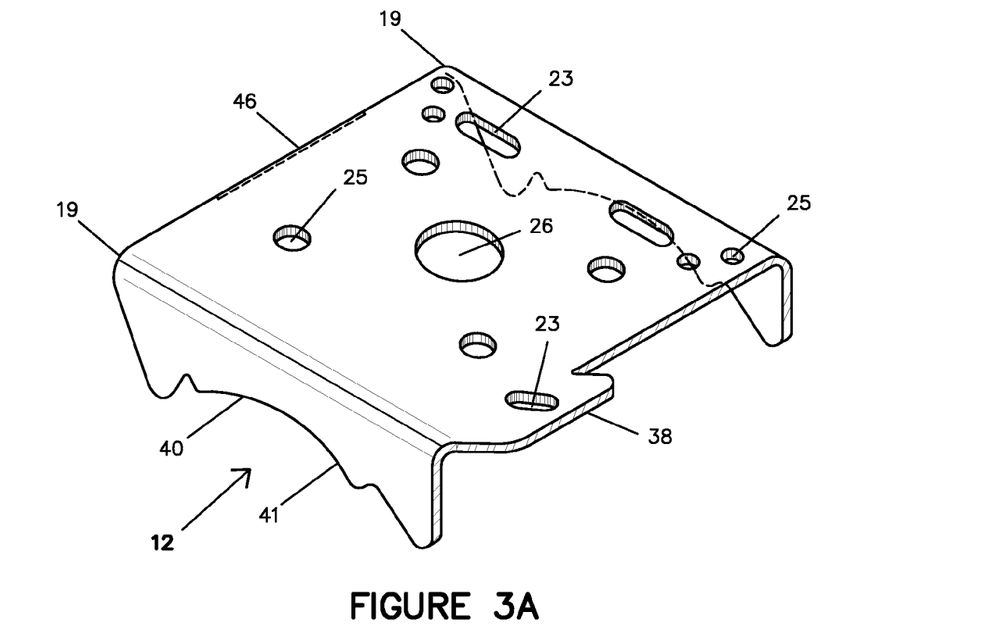
FIG. 3A is an isometric view taken from one end of the mast arm saddle shown in FIG. 1.
Figure 3B:
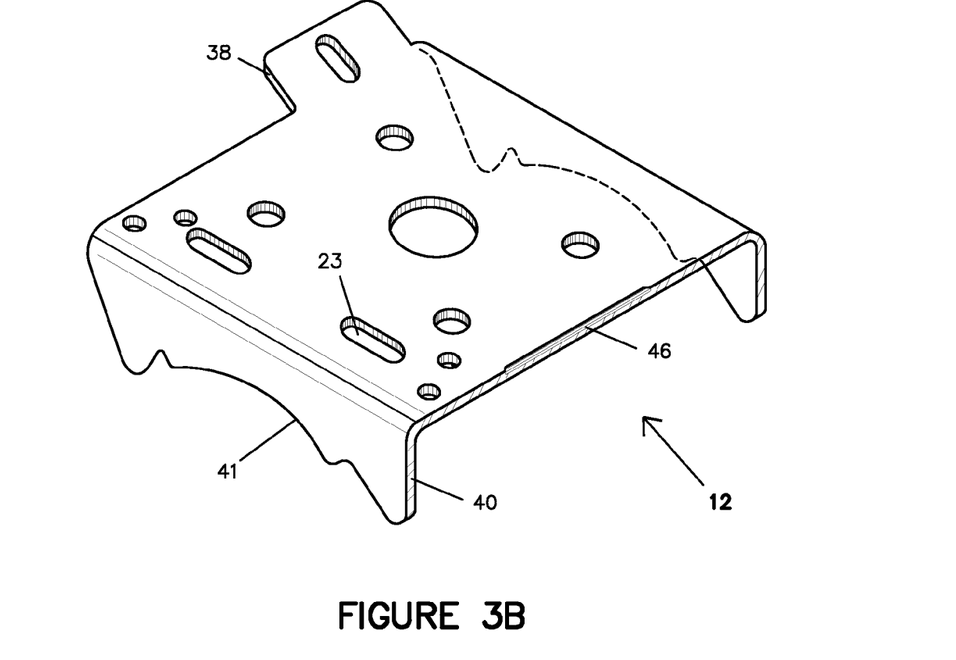
FIG. 3B is also an isometric view of the opposite end of the mast arm saddle shown in FIG. 3A.
Figure 4:
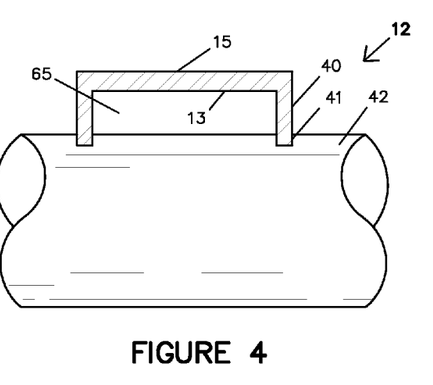
FIG. 4 is a side view of a mast arm saddle and a mast arm.

FIGS. 3A and 3B are isometric views showing the mast arm saddle 12 for reference without any attachments. Both FIGS. 3A and 3B generally illustrate the saddle 12 post cutting and bending. Eased-rounded edges 46 are shown and may be provided to prevent any fraying or shear points of the cable 16. In some embodiments, the mast arm saddle may include a "turned down" longitudinal flange (not shown) to utilize a thinner saddle material. The longitudinal turned down flange is free from contact with the mast arm.

The swivel plate 14 may be similarly fabricated (laser cut) from a flat plate. The swivel plate 14 may include one or more arcuate slots 24 for receiving fasteners therethrough for connecting the mast arm saddle 12 to the swivel plate 14. The swivel plate 14 may also include an opening 26 that is sized and shaped to receive wires for electrical connections for the traffic control device. The opening 26 in the mast arm saddle 12 and the opening 26 in the swivel plate 14 may be aligned to facilitate passage of the electrical connections therethrough.

Figure 2:
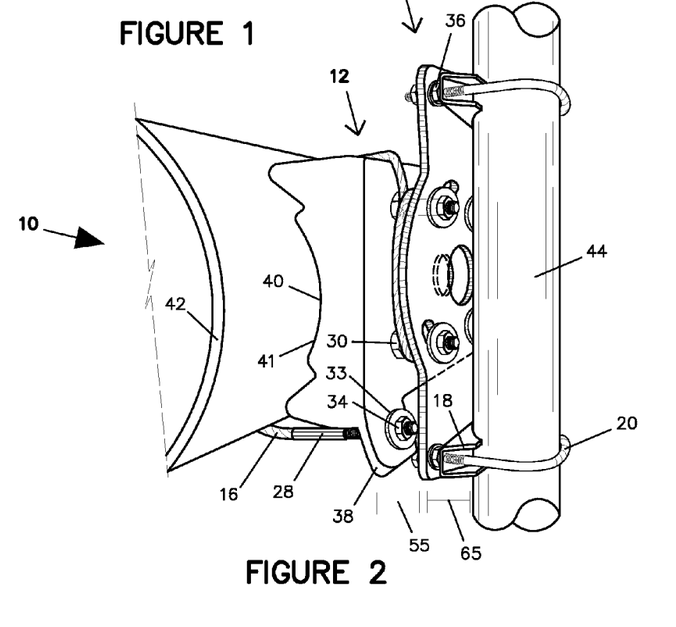
FIG. 2 is a left hand view illustration of an embodiment of a mast arm saddle and swivel plate of an attachment assembly and a sectional portion of a standard traffic signal support tube.
Figure 6:
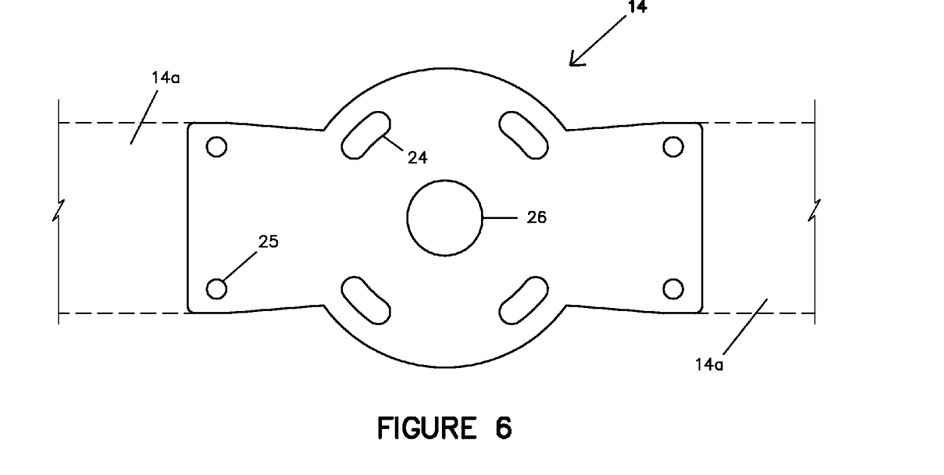
FIG. 6 is a plan view of an embodiment of a swivel plate.

The swivel plate 14 is shown for reference attached to saddle 12 in FIG. 1 without the traffic signal tube as depicted and more fully described in FIG. 2. As shown in FIG. 1, the swivel plate 14 may include four arcuate slots 24 that receive bolts 32 and inverted flange nuts 30 (phantom). Vertical and in some installations horizontal mounting is possible by utilizing slots 24 to adjust the swivel plate 14 in order to achieve the required plumbness (vertical applications) or level (horizontal applications). FIG. 6 is a plan view showing the swivel plate 14 without any attachments. In the embodiment shown in FIG. 6, an expansion area 14a may be included in some embodiments for additional flexibility of the swivel plate 14. The wire access opening 26 and the arcuate slots 24 are also shown. Fastening apertures 25 may be used for securing the swivel plate 14 to a signal securing tube 44 using utility U-bolts 20 (shown in FIG. 2) or flexible signal brackets 17 (shown in FIGS. 7 and 8.).

Figure 5:
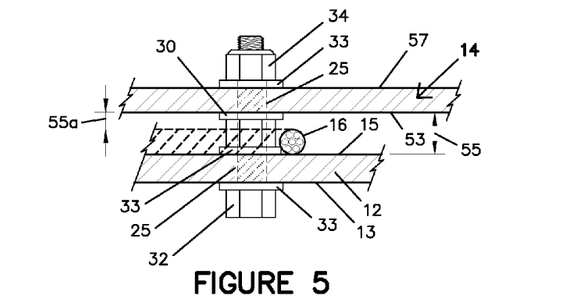
FIG. 5 is a cross sectional view taken along 5 of FIG. 1.

FIG. 5 is a cross sectional view taken along 5 of FIG. 1. For reference, a portion of the mast arm saddle 12 and swivel plate 14 is shown with an exemplary connection. By way of non-limiting example, an inverted flange nut 30 may be installed over washer 33 secured to the mast arm saddle 12. In some embodiments, washers, bushings, coupling nuts or other fasteners may also be used. The purpose of inverting the flange nut 30 is dual functioning; first to allow the mast arm saddle 12 and the swivel plate 14 to move relative to one another by the separation of the second surface 15 of the mast arm saddle 12 from a first surface 53 of the swivel plate 14, creating a displacement gap 55. The term "displacement" as used herein is defined as the distance of a flexible body from its equilibrium. In some embodiments, it may be preferable to increase a length of a gap 55a to provide additional displacement and/or clearance of the cable 16. In contrast to the typical prior art connections where the saddle and plate faces are typically closely positioned adjacent to each other for rigidity with no space therebetween, the flange nut 30 and washer 33 positioned between the mast arm saddle 12 and the swivel plate 14 create the displacement gap 55 at each moment connection area that allow one or both the mast arm saddle 12 and swivel plate 14 to flex independent from each other. The second function is to capture the cable 16 temporarily while pre-tensioning as described with reference to installation of the attachment assembly 10. The final securement of the swivel plate 14 will prevent release of a cable loop 19.

Figure 11A:
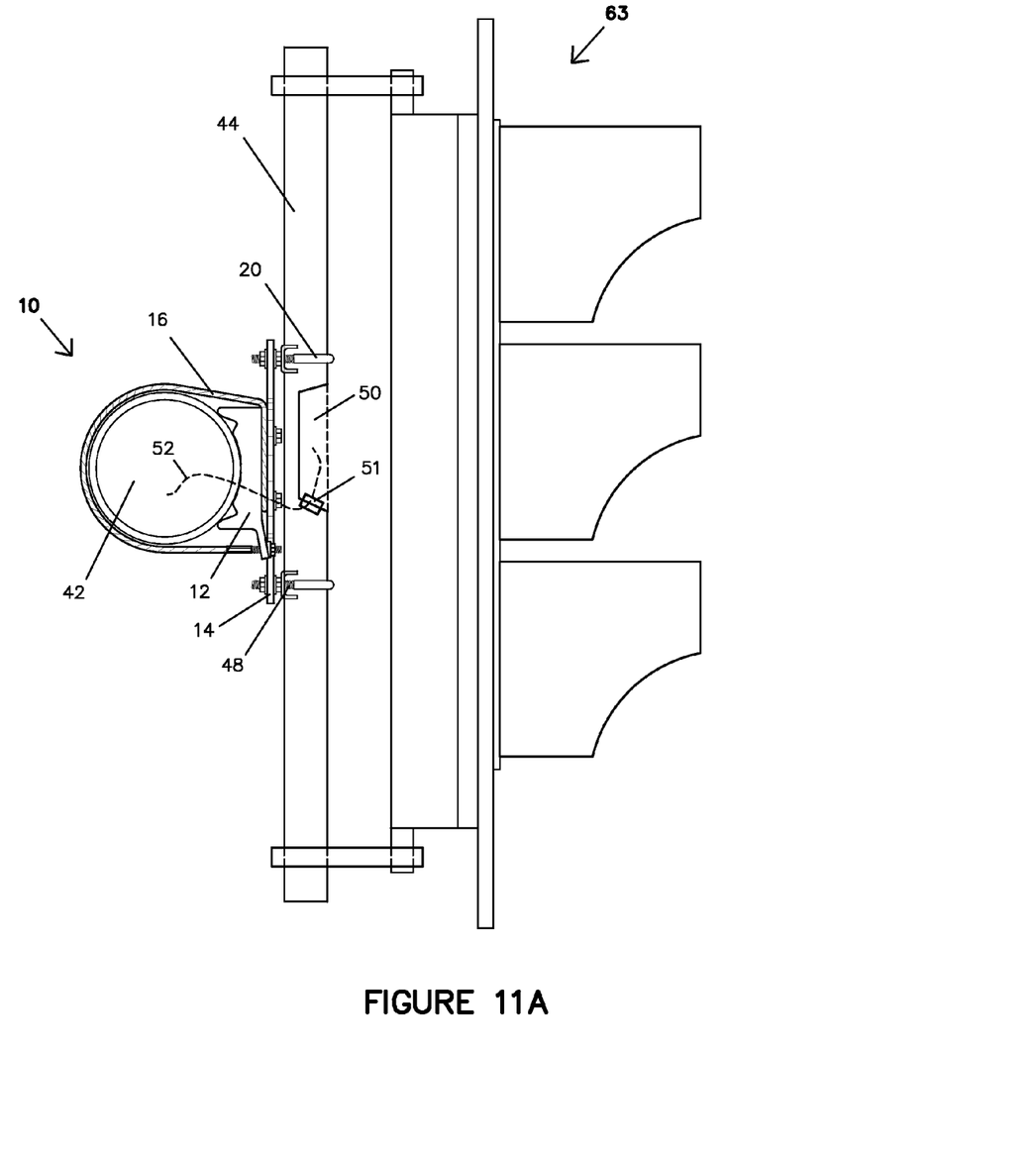
FIGS. 11A and 11B illustrate a side view of an embodiment of a mast arm saddle and a swivel plate with a single unit traffic signal mounted thereto.
Figure 11B:
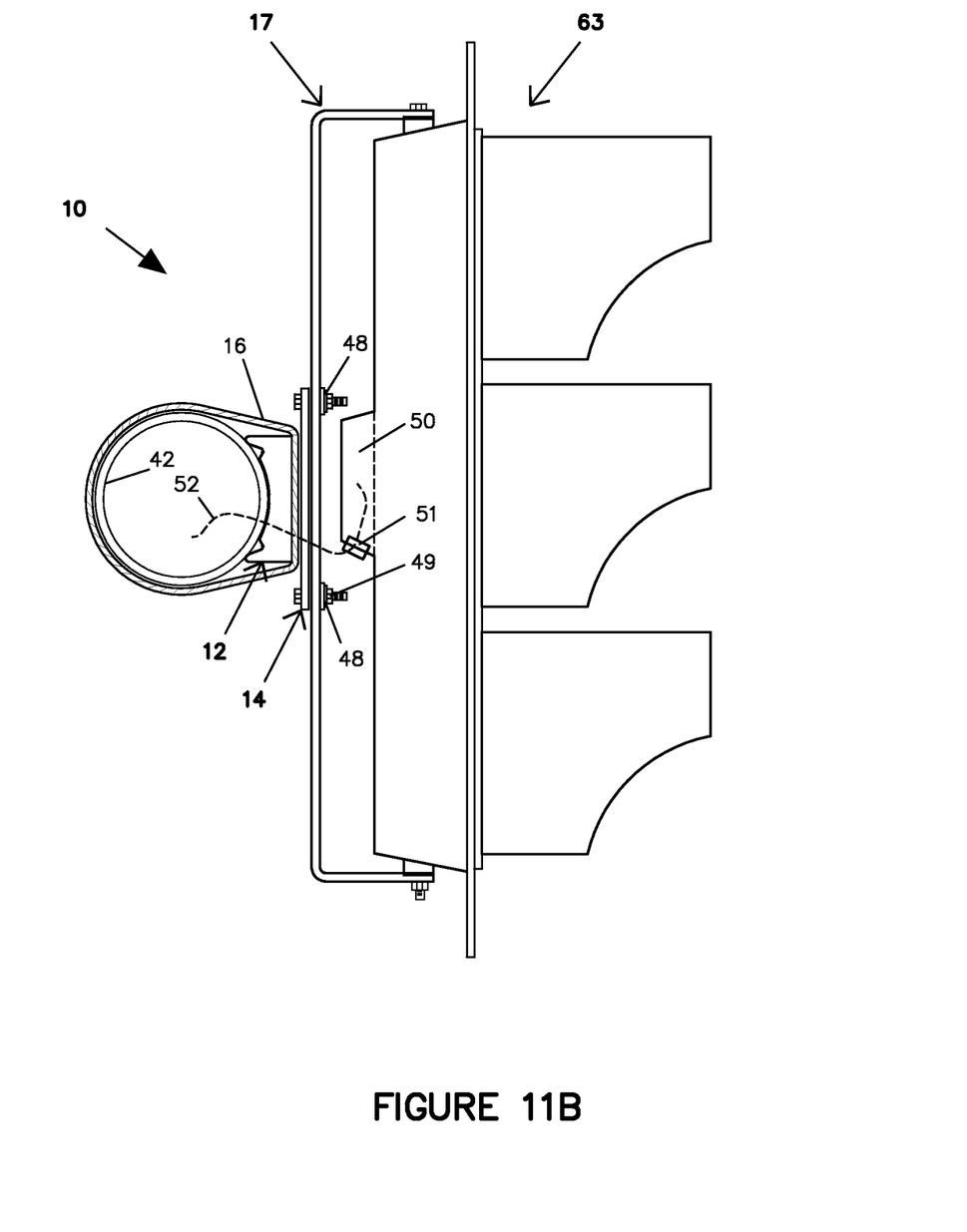

FIGS. 2, 7, 11A and 11B illustrate the mast arm saddle 12 shown connected to the mast arm 42 with the curved surface 41 of the engagement flange 40 positioned against the mast arm 42. FIG. 2 illustrates a conventional signal support tube 44 connected to flexible the swivel plate 14 without the traffic control device for clarity. FIG. 2 depicts a portional side view of the attachment assembly 10 showing the displacement gap 55 between the mast arm saddle 12 and the swivel plate 14. FIG. 2 also illustrates a gap 65 between the swivel plate and the support tube 44. For reference, the signal support tube 44 is sometimes channeled and in most instances gusseted for added strength—both common and typical to mast arm traffic signal mounting hardware. The tube 44 generally includes a bottom bracket and a top bracket with a traffic control device between the two brackets (FIG. 11A). In some embodiments, it may be preferable to replace the rigid tube and cast aluminum brackets with flexible rectangular stainless steel signal bracket 17 with at least one cold bent approximate 90° integral support arm at one end and another support arm opposite of the first support arm with a means of adjustment to secure preferably a single unit signal housing 63 with integral terminal 50 as shown in the embodiment in FIG. 11B. In some embodiments, the single unit signal housing 63 may include a backplate. The signal bracket 17 may be connectable to the swivel plate 14, and in some embodiments is connectable to the saddle plate 12 only, and perform as a swivel and a means for supporting a traffic control device. In the embodiment shown in FIG. 11B, the signal bracket 17 is a metal rectangular single piece bracket. In some instances it may be preferable to have at least one 90° return integral to the longitudinal portion and another return not integral but adaptable to the longitudinal portion. The bracket 17 is secured to the swivel plate 14 utilizing a clamping plate 48 and fasteners 49. Longitudinal adjustments, both vertical and horizontal applications, is provided by sliding the bracket 17 in the desirable direction between the swivel plate 14 and clamp plates 48 prior to final tightening of fasteners 49.

Final electrical connections are made utilizing conductors 52 into terminal housing 50 through waterproof grommet 51 to connection block (not shown) located in terminal housing 50. Embodiments of the attachment assembly 10 are also adaptable to be used with common tube, brackets, traffic control device and a means to provide wire access.

The embodiments, for example as shown in FIGS. 2, 7, 11A, 11B, and 12-15 take into account the mass of the bracket(s), tube 44 or signal bracket 17 and traffic control device as it relates to gravitational and wind loading in respect to acceleration and deceleration forces upon the saddle plate 12 and swivel plate 14 and sometimes the signal bracket 17. The flexibility and the resiliency of the attachment assembly 10 are a function of the mass of the traffic control device, the configuration of the swivel plate, the length of the swivel plate and/or the signal bracket, the thickness of the swivel plate and/or the signal bracket, the width of the mast arm saddle and the thickness of the mast arm saddle. The first amount of flexibility is determined by the material thickness and the amount of lateral clearance in the gap 65 between the second face 57 of the swivel plate 14 and the tube 44 or the signal bracket 17. The gap 65 is created by either a saddle 18 against the support tube 44 and/or stand off nuts 36 and is directly proportional to the overall length of the swivel plate 14. The tube 44 is secured to swivel plate 14 utilizing U-bolts 20 around the tube 44, through the saddle 18 and connected with appropriate fasteners. A similar gap 65 is created between the swivel plate 14 and the flexible signal bracket 17 described with reference to FIG. 11B. The second amount of flexibility is determined by the configuration of the swivel plate.

An exemplary method for installing the attachment assembly 10 is described. One skilled in the art will recognize that other methods may also be used, including, but not limited to metal bands or bent to fit bolts. Prior to installation on the mast arm 42, a swedge bolt 28 connected to the cable 16 is inserted into the adjustment slot 23 of the angle connection flange 38 of the mast arm saddle 12 and is temporarily attached utilizing washer 33 and nut 34. The connection flange 38 of the mast arm saddle 12 has an upward acute plane to lessen cable stress from different diameter mast arms. It is important at this stage to just start nut 34 preferably less than a full nut thread length so as to be able, upon tensioning, achieve the greater amount of tensioning range. The free end of the cable 16 is inserted through a cable clamp 22 connected to the mast arm saddle 12, then threaded upward through the slot 23 over the second surface 15 of the saddle 12 to the slot 23a then through the slot 23a downward continuing along the first surface 13 of the mast arm saddle 12 and outward and through a clamp 22a. At this stage the cable 16 now has a loop 19 which is temporarily secured to the attachment assembly 10.

Figure 7:
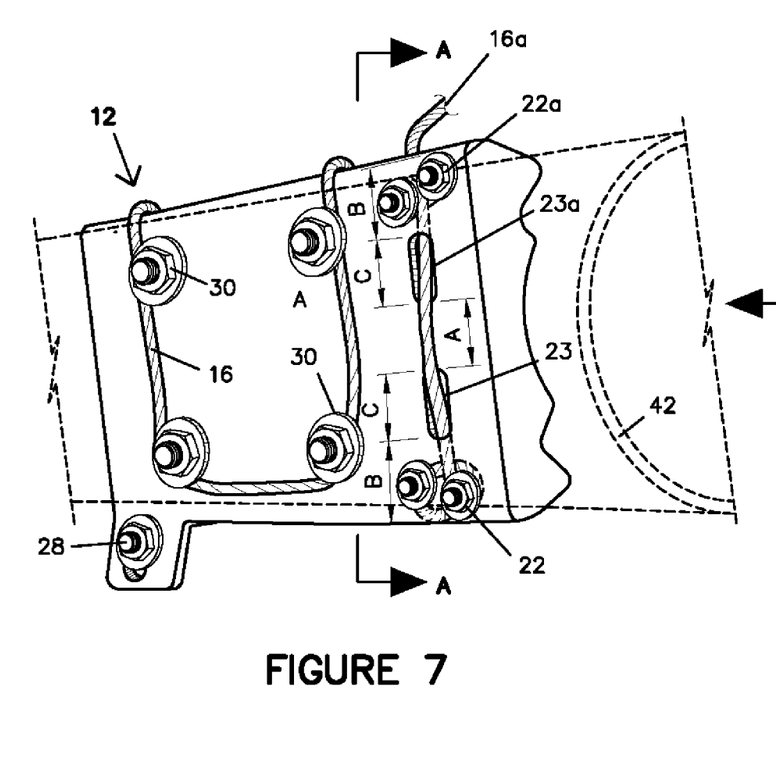
FIG. 7 is an isometric view of an embodiment of a mast arm saddle.

Prior to securing to the attachment assembly 10 utilizing inverted flange nuts 30 as shown in FIG. 1, the saddle 12 is placed temporarily on top of mast arm 42 utilizing the engagement flanges 40. The loop 19 is brought up over the mast arm 42 and hooked around inverted flange nuts 30, see also FIG. 5. Slack in the cable 16 may then be removed by hand pulling of the cable end 16*a* to pre-tension the cable 16. As shown in FIG. 7, the cable 16 extends a length A along the second surface 15 of the mast arm saddle 12, a length B along the first surface 13 of the mast arm saddle 12 and through slots 23 and 23*a* in the mast arm saddle 12 having a length C.

Figure 8:
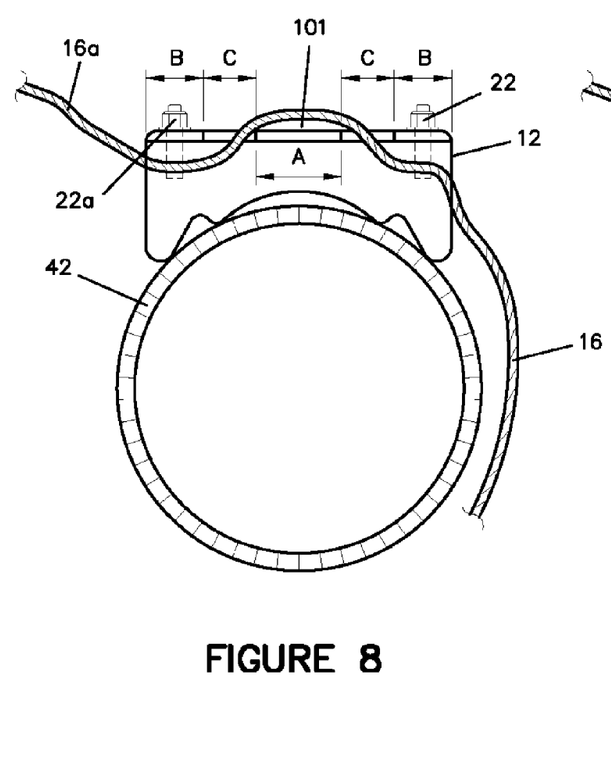
FIG. 8 is a cross section taken along line A-A of FIG. 7.

FIG. 8 illustrates a cross sectional view taken along line A-A of FIG. 7 and showing the mast arm saddle 12 positioned on top of the mast arm 42. A small gap 101 may be provided between the cable 16 and the second surface 15 where the cable 16 extends the length A between the slots 23 and 23*a* and the cable clamp 22*a* is temporarily tightened. The cable clamps 22, 22*a* may include a standard cable saddle depending upon the wind loading at a particular location.

Figure 9:
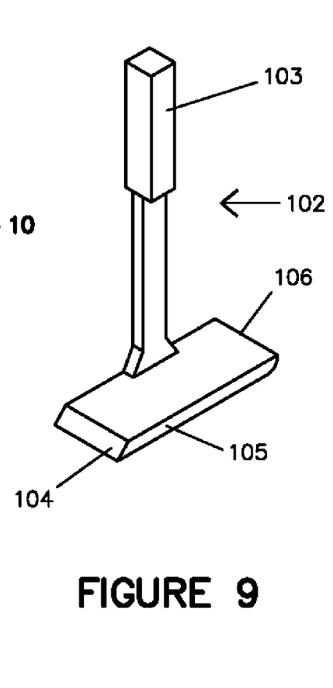
FIG. 9 is an embodiment of a tool that may be used to apply tension to the attachment assembly.

FIG. 9 illustrates a tool 102 that may be used to apply pre-tension between the mast arm saddle 12 and the mast arm 42. The tool 102 includes a handle 103 and a lever plate 105. In some embodiments, the lever plate 105 is integrally formed with the handle 103. The lever plate 105 has a first end 104 having a chisel shape to facilitate placement of the end 104 between the cable 16 and the second surface 15 of the mast arm saddle 12. The lever plate 105 includes a second end 106 that may include a rounded shape that allows for less stress on the cable 16.

Figure 10:
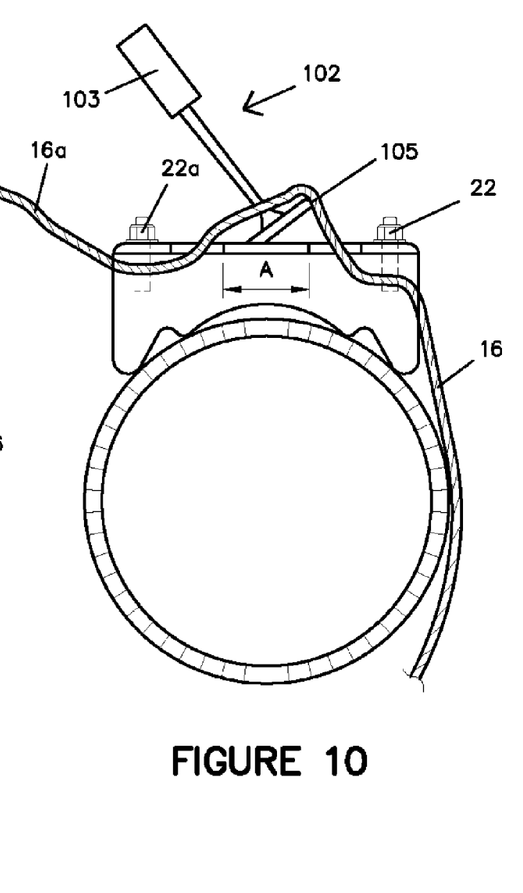
FIG. 10 illustrates an embodiment of the tool applying tension to the attachment assembly.

FIG. 10 illustrates use of the tool 102 with the mast arm assembly 10. As shown, the lever plate 105 of the tool 102 may be inserted into the gap 101 and rotated until cable slack is removed from the cable 16 and a firm tension is applied. While maintaining the tension, cable clamp 22 is tightened. The tool 102 is removed and clamp 22*a* is loosened. Extra slack is removed by pulling on cable end 16*a* and then secured by retightening clamp 22*a*. The mast arm saddle 12 is rotated on the mast arm 42 to the desired vertical plane relative to the roadway below. In some instances, depending on the shape of the mast arm 42, i.e., a 12 sided polygon, it may be difficult to rotate the mast arm saddle 12. By loosening the clamp 22, only the tensioning forces between the tool-leverage and the hand tensioning of the cable slack described above remain and should minimize any difficulty in rotating the mast arm saddle 12. The swedge bolt 28 for the cable 16 is tightened to cinch the mast arm saddle 12 to the mast arm 42.

In some embodiments, the traffic control device 63 is connected to the support tube 44 using the appropriate fasteners. Then the tube 44 is connected to the swivel plate 14 for example using u-bolts 20 connected to saddles 18 as shown in FIG. 11A. The swivel plate 14 with the traffic control device 63 connected thereto is connected to the mast arm saddle 12 and the slots 24 of the swivel plate 14 are used to adjust the traffic control device to be level or plumb.

Figure 12:
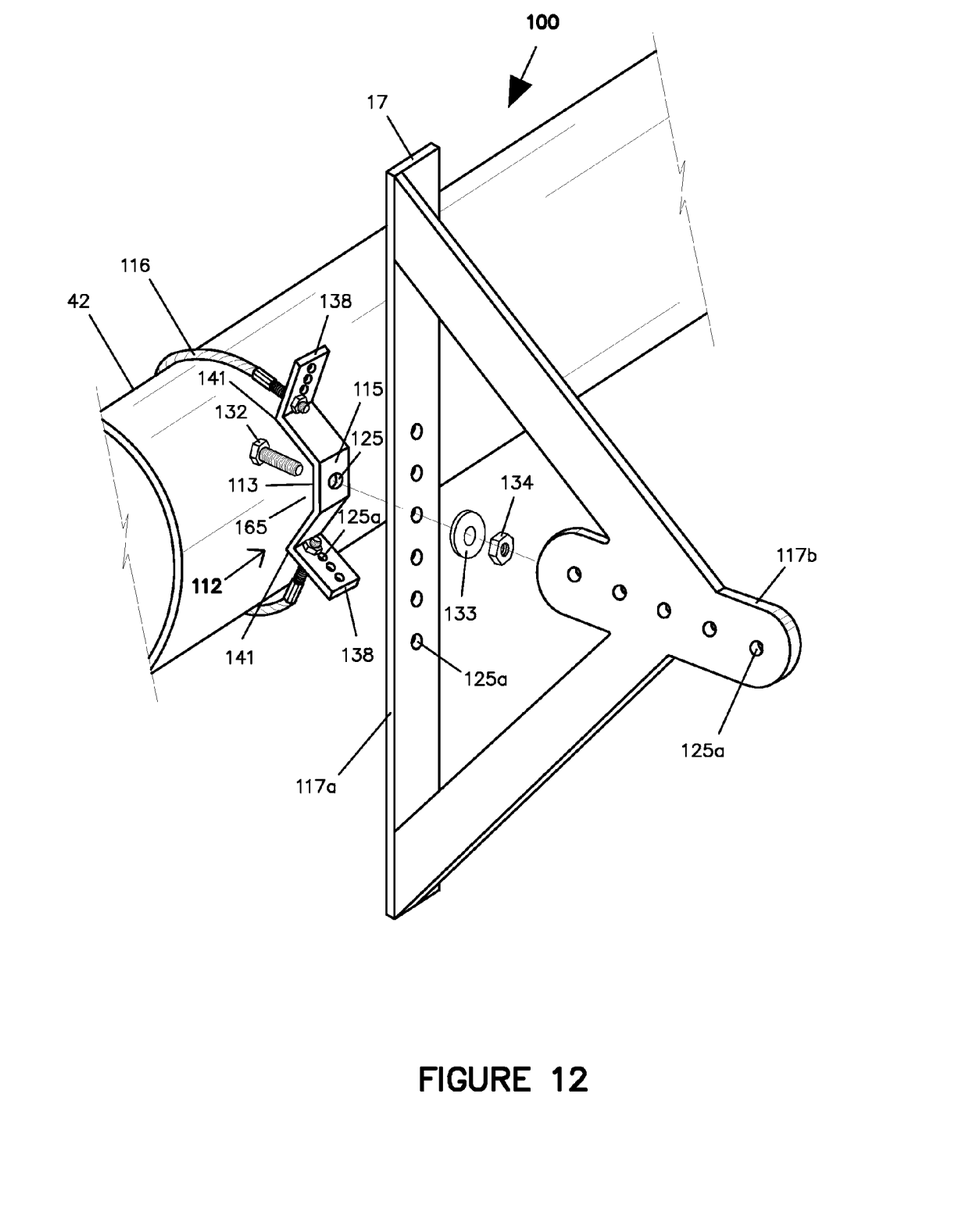
FIG. 12 is a portional isometric view of an embodiment of an attachment assembly for horizontal installations.

FIG. 12 illustrates an embodiment of an end bracket assembly 100 that may be part of the attachment assembly 10. For clarity, the traffic control device that is mounted to the mast arm 42 using the end bracket assembly 100 has been omitted. In some embodiments using the end bracket assembly 100, one mast arm saddle or plate 112 may be operably connected to the traffic control device at each end of the traffic control device, for example when the traffic control device is horizontally mounted on the mast arm 42. As shown in FIG. 12, the mast arm saddle 112 includes a first face 113 that is spaced apart from the mast arm 42 by a displacement gap 155. Engagement portions 141 of the mast arm saddle 112 are adapted to contact the mast arm 42. The gap 155 allows the mast arm saddle 112 to flex in response to wind force. The mast arm saddle 112 may include an angled connection flange 138 extending from the engagement portions 141. Each connection flange 138 may include one or more apertures 139 through with a cable 116 may be extended and secured to connect the saddle 112 to the mast arm 42.

As shown in FIG. 12, the mast arm saddle 112 is fastened to the mast arm 42 using adjustment holes 125*a* and a cable 116 inserted through the adjustment holes 125*a*. The cable 116 may be adjustably threaded through the holes 125*a* and secured to angle connection flanges 138 similar to the securement of the cable 16 described above. Each angled connection flange may include a plurality of adjustment holes 125*a*. A flexible signal bracket 117 may be attached to the mast arm saddle 112 utilizing a bolt 132, a washer 133 and a lock nut 134. Prior to finally securing the signal bracket 117, the attachment assembly 100 may be leveled utilizing apertures 25*a* of a vertical flange 117*a*. The vertical flange 117*a* is designed to flex in the direction of the wind force and in the process respond dynamically as described above. A signal attachment plate 117*b* of the signal bracket 117 includes adjustment apertures 125*a* to connect the traffic control device to the signal bracket 117. The mast arm saddle 112 may be manufactured using materials and methods similar to those described above for the mast arm saddle 12.

Figure 13:
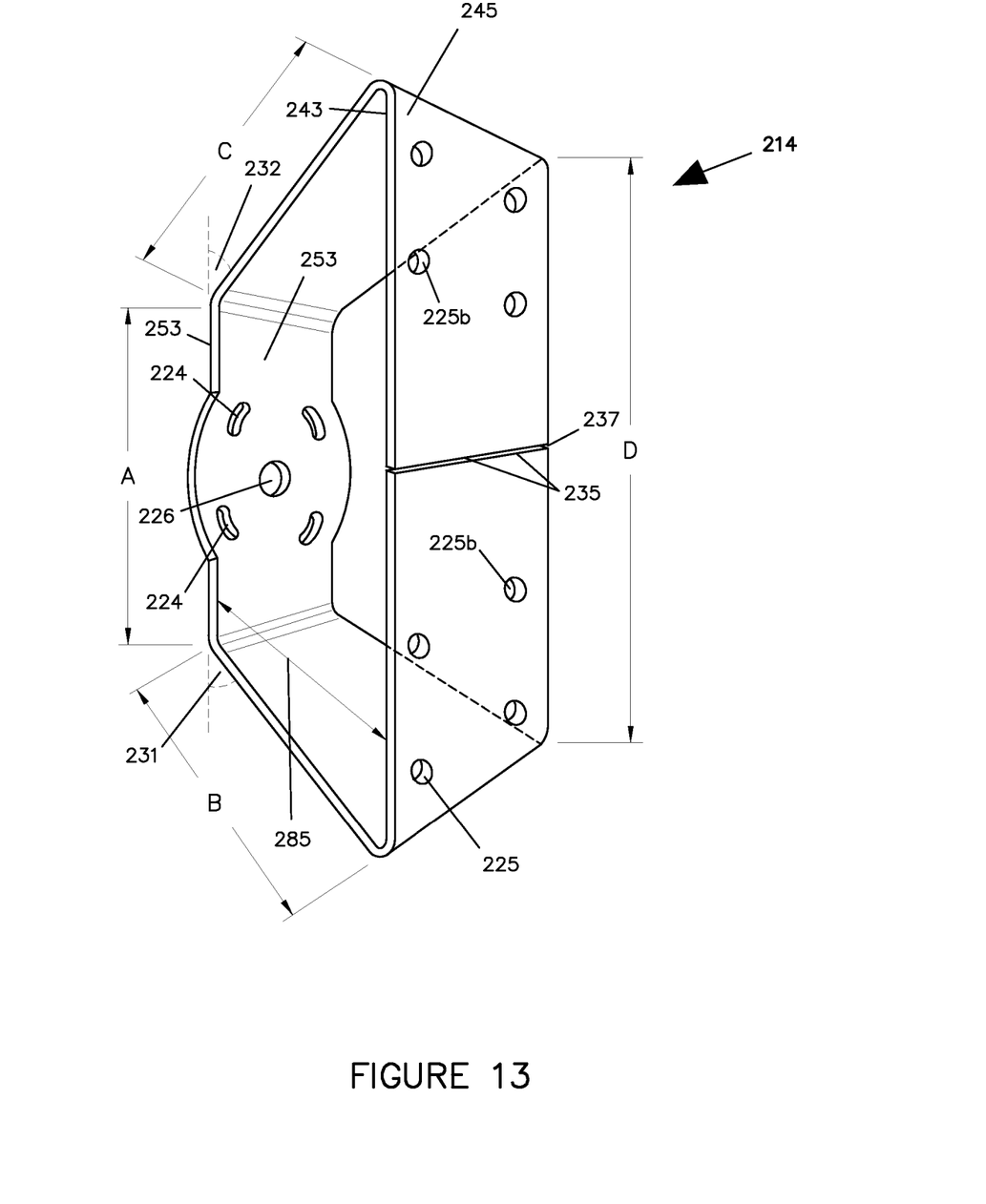
FIG. 13 is an isometric view of an embodiment of a saddle plate providing both horizontal and vertical movements.

FIG. 13 illustrates an isometric view of an embodiment of a swivel plate 214. The swivel plate 214 may be attached to a mast arm saddle 12, 112 as described herein or to a conventional mast arm saddle. The swivel plate 214 may be used with a conventional rigid tube type signal mounting devices. In some embodiments the swivel plate 214 dynamically responds to vertical or horizontal displacements. In some embodiments, the swivel plate 214 dynamically responds to both vertical and horizontal displacements. The swivel plate 214 may include one or more arcuate slots 224 for receiving fasteners therethrough for connecting the mast arm saddle to the swivel plate 214. The swivel plate 214 may also include an opening 226 that is sized and shaped to receive wires for electrical connections for the traffic control device. The swivel plate 214 may include four arcuate slots 224 that receive bolts 32 and inverted flange nuts 30 similar to the connection illustrated in FIG. 5. Vertical and in some installations horizontal mounting is possible by utilizing slots 224 to adjust the swivel plate 214 in order to achieve the required plumbness (vertical applications) or level (horizontal applications). Fastening apertures 225*b* may be used for securing the swivel plate 214 to a signal securing tube 44 using utility U-bolts 20 (similar to the connection shown in FIG. 2) or flexible signal brackets 17 (similar to the connection shown in FIGS. 11 and 12.) Portion A of the swivel plate 214 is adapted to perform the same basic function and mast arm saddle attachment as described above with reference to swivel plate 14. Portion A includes a first surface 253 and a second surface 257. The first surface 253 may be spaced apart from the second surface 15 of the mast arm saddle 12 when the mast arm saddle 12 and the swivel plate 214 are operably connected to allow one or both of the mast arm saddle 12 and the swivel plate 214 to flex. In some embodiments, the first surface 253 of the swivel plate 214 is adapted to be oriented toward the mast arm 42 and the first surface 253 may extend substantially parallel to a longitudinal axis of the mast arm 42 or substantially perpendicular a longitudinal axis of the mast arm 42 depending on the orientation of the traffic control assembly. In some embodiments, such as windy environments, the length of the portion A and/or portion D may be longitudinally extended (proportional to the remainder of the swivel plate 214) to increase flexibility of the swivel plate 214.

Portion B descends from portion A at an angle 231. In some embodiments, the angle 231 may be about 10-15°, about 20°, about 25° or 30° or greater than 30°. The angle 231 may depend on the weight of the traffic control device attached thereto and/or the wind zones and/or the amount of flexibility required dependent on the wind zones. Portion C ascends from portion A at an angle 232. The angle 232 may be equal to, greater than or less than the angle 231. The angle 232 will depend on the desired amount of flexibility of the attachment assembly and the weight of the traffic control assembly and/or the position of the traffic control assembly. In some embodiments, the angle 232 may be greater than the angle 231 to help even the weight distribution. The lengths of portion B and portion C may be the same or portion C may be shorter or longer than portion B depending on the degree of flexibility required for the attachment assembly.

Figure 14:
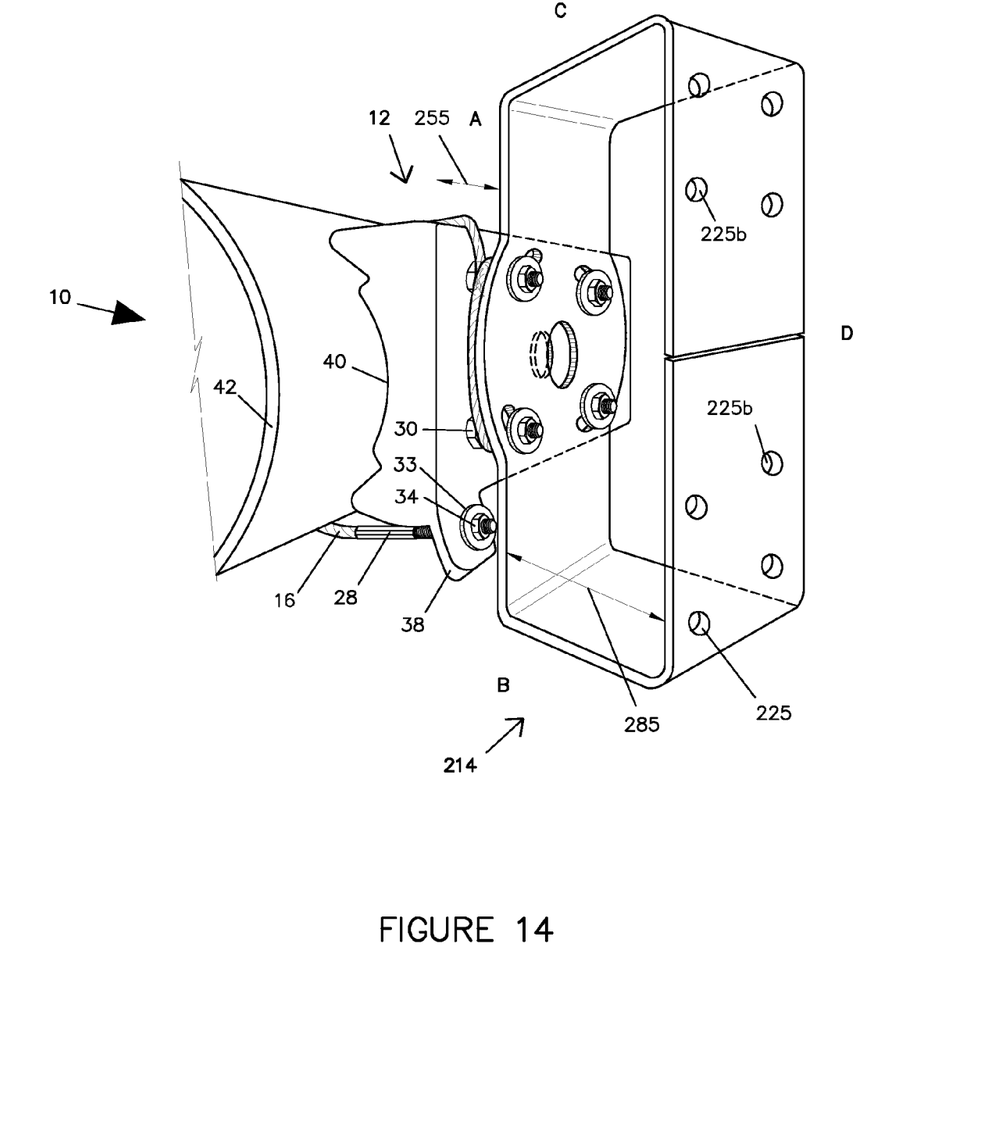
FIG. 14 is an isometric view of an embodiment of the saddle plate shown in FIG. 9 connected to a mast arm.

Portion D may extend substantially parallel to portion A in some embodiments. Even if the portions B and C have different lengths or extend at different angles from portion A, portion D may still be considered to extend substantially parallel to portion A. Portion D includes a first surface 243 facing the portion A and a second surface 245 facing toward a traffic control assembly. As shown in FIG. 9, portion D may have a length that is longer than portion A. In some embodiments, the lengths of portion A and portion D may be the same or portion A may be shorter than portion D. Portion D by utilizing the outer attachment holes 225 may be connected to the bracket 17 or the support tube 44 similar to the embodiments described above. In some embodiments, where additional flexibility is desired, the signal bracket (not shown) can be installed so that a displacement gap is provided between the bracket and the swivel plate 214. The swivel plate 214 may be fabricated out of materials similar to the materials describe above for the swivel plate 14. The swivel plate 214 may be fabricated similar to the methods described above. In some embodiments, the swivel plate 214 may be formed as a unitary piece, first cut out as a flat plate with a plurality of apertures. Portions B and C may be cold bent at an angle extending from portion A. Portion D may be cold bent at an angle extend from portions B and C so that ends 235 of the plate 214 meet or are positioned adjacent to each other so that a generally four sided plate is formed. In some embodiments, the ends 235 are spaced apart so that a gap is formed in the portion D. In some embodiments, portion D may include a joint 237 that is welded together at the ends 235 for added strength in high wind areas. A displacement gap 285 extends between the portions A and D that is configured to allow the swivel plate 214 to flex. The swivel plate 214 may be connected to the saddle plate 12 described above and may include a displacement gap 255 between the saddle plate 12 and the swivel plate 214 as shown in FIG. 14.

In some embodiments, the swivel plate 214 may be a tetragon, a trapezoid, a parallelogram, a rectangle or any other four sided configuration. In some embodiments, one or more of the portions A-D of the swivel plate 214 may include a bend or a curve. In some embodiments, the portions A and D may be substantially parallel and the portions B and C may be curved.

Figure 15:
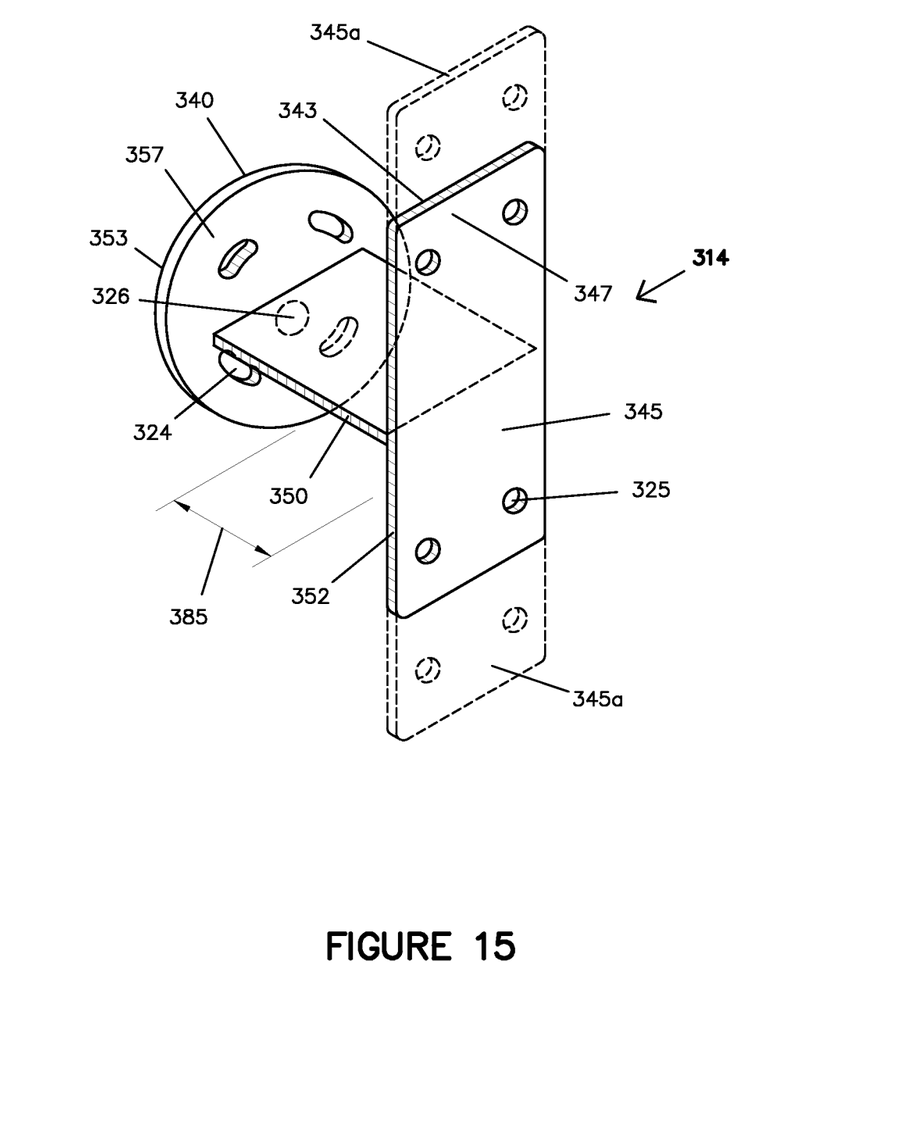
FIG. 15 is an isometric view of an embodiment of a saddle plate in accordance with the present invention.

FIG. 15 illustrates an isometric view of another embodiment of a swivel plate 314 in accordance with the present invention. The swivel plate 314 is designed to be used with the mast arm saddles described herein or with traditional rigid mast arm saddles. The swivel plate 314 may be used with traditional support tubes and/or brackets as well as with flexible brackets described herein. Similar to the embodiments described above, the swivel plate 314 may act as a dampener for reducing harmful oscillations. The swivel plate 314 includes a first plate 340 and a second plate 345. A flange 350 extends between the first and second plates 340, 345. In some embodiments, the first and second plates 340, 345 extend substantially parallel to each other and the flange 350 extends substantially perpendicular to the first and second plates 340, 345. In other embodiments, the first and second plates 340, 345 and the flange 350 may have other configurations. In some embodiments, the flange 350 may be centrally positioned with respect to one or both of the first plate 340 and the second plate 345. In some embodiments, the flange 350 may be offset from center of one or both of the first plate 340 and the second plate 345. The first plate 340 is adapted to be connected to a mast arm saddle, such as mast arm saddle 12 described above, that is connected to the mast arm 42. The first plate 340 includes a plurality of arcuate slots 324 for connection of the first plate 340 to the mast arm saddle. The first plate includes a first surface 353 and a second surface 357. The first surface 353 may be facing and spaced apart from the second surface 15 of the mast arm saddle 12 when the mast arm saddle 12 and the swivel plate 314 are operably connected to allow one or both of the mast arm saddle 12 and the swivel plate 314 to flex. In some embodiments, the first surface 353 of the swivel plate 314 is adapted to be oriented toward the mast arm 42.

The second plate 345 includes a plurality of openings 325 for connection of the second plate 345 to a bracket or support tube connected to a traffic control device. The second plate 345 includes a first surface 343 facing the second surface 357 of the first plate 340 of the swivel plate 314 and a second surface 347 facing toward a traffic control assembly. As shown in FIG. 15, the second plate 345 may have a length that is longer than the first plate 340. The second plate 345 may be lengthened to increase flexibility of the swivel plate 314 as shown by dashed lines 345*a*. The flange 350 may also be lengthened to increase flexibility. A displacement gap 385 is formed between the first plate 340 and the second plate 345 that also allow the swivel plate 314 to flex. The swivel plate 314 may be made out of flexible metals such as stainless steel and fabricated by welding, cut and fold, injection molding, bolting and combinations thereof.

While the embodiments here in have been described with reference to use with a mast arm system, the embodiments may also be used with lighting poles and other structures, such as street lighting and high mast interstate lighting systems. The embodiments described herein may also be used with signs.

The above Figures and disclosure are intended to be illustrative and not exhaustive. This description will suggest many variations and alternatives to one of ordinary skill in the art. All such variations and alternatives are intended to be encompassed within the scope of the attached claims. Those familiar with the art may recognize other equivalents to the specific embodiments described herein which equivalents are also intended to be encompassed by the attached claims.

The invention claimed is:

1. An attachment assembly for mounting a traffic control device to a mast arm, the attachment assembly comprising an attachment device that is connectable to a mast arm saddle, the mast arm saddle operably connected to the mast arm and positioned at least partially between the mast arm and the attachment device, the attachment device comprising:
- a first portion having a first length, the first portion comprising a plurality of apertures, the first portion adapted to operably connect to the mast arm saddle so that a first surface of the first portion is oriented toward the mast arm saddle and spaced apart from a surface of the mast arm saddle facing the first surface of the first portion;
- a second portion having a second length, the second portion comprising a plurality of apertures, the second portion extending substantially parallel to the first portion along at least a portion of the first length, the second portion adapted to operably connect to the traffic control device so that a second surface of the second portion is oriented toward the traffic control device; and
- a third portion having a third length and extending between the first portion and the second portion so that a gap defining an open space is formed between a second face of the first portion and a first face of the second portion that allows the attachment device to flex when the traffic control device is mounted to the mast arm.

2. The attachment assembly according to claim 1, wherein the attachment device further comprises a fourth portion having a fourth length and extending between the first portion and the second portion.

3. The attachment assembly according to claim 2, wherein the attachment device has a trapezoid shape.

4. The attachment assembly according to claim 2, wherein the third portion extends at an angle of about 10° to about 45° from the first portion.

5. The attachment assembly according to claim 2, wherein the fourth portion extends at an angle of about 10° to about 45° from the first portion.

6. The attachment assembly according to claim 2, wherein the third portion extends at an angle from the first portion that is different than an angle that the fourth portion extends from the first portion.

7. The attachment assembly according to claim 2, wherein the third length and the fourth length are different.

8. The attachment assembly according to claim 1, wherein at least one of the plurality of apertures has an arcuate shape.

9. The attachment assembly according to claim 1, wherein the attachment device is made of unitary construction.

10. The attachment assembly according to claim 2, wherein ends of the attachment device are welded together.

11. The attachment assembly according to claim 1, wherein the third portion extends between a central portion of the first and the second portions.

12. The attachment assembly according to claim 1, wherein the attachment device dynamically responds to both vertical and horizontal displacement of the traffic control device.

13. An attachment assembly for mounting a traffic control device to a mast arm, the assembly comprising:
- a first attachment device operably connectable to a second attachment device, the first attachment device comprising:
  - a first portion having a first length and a first surface of the first portion of the first attachment device is oriented toward the mast arm;
  - a second portion having a second length, the second portion extending substantially parallel to the first portion along at least a portion of the first length, a second surface of the second portion of the first attachment device is oriented toward the traffic control device; and
  - a third portion having a third length and extending between the first portion and the second portion so that a gap defining an open space is formed between a second surface of the first portion and a first surface of the second portion that allows the first attachment device to flex when the traffic control device is mounted to the mast arm; and
- a second attachment device having a first surface oriented toward the mast arm and a second surface opposite the first surface oriented toward the first attachment device, the second attachment device operably connectable to the mast arm, the first attachment device being connected to the second attachment device so that the first surface of the first portion is spaced apart from the second surface of the second attachment device.

14. The attachment assembly according to claim 13, further comprising a cable operably connected to the second attachment device and connectable to the mast arm so that the first surface of the second attachment device faces the mast arm and a portion of the cable is positionable between the second surface of the second attachment device and the first surface of the first portion of the first attachment device.

15. The attachment assembly according to claim 13 further comprising a fourth portion of the first attachment device, the fourth portion having a fourth length and extending between the first portion and the second portion.

16. The attachment assembly according to claim 13, wherein the second attachment device is flexible.

17. The attachment assembly according to claim 13, wherein the second attachment device comprises an engagement flange extending away from the first surface of the second attachment device, the engagement flange having a surface adapted to contact the mast arm so that the first surface of the second attachment device is spaced apart from the mast arm.

18. The attachment assembly according to claim 13, wherein the second attachment device comprises an angled connection flange extending away from the mast arm.

19. The attachment assembly according to claim 13, wherein a plurality of connectors connect the first attachment device to the second attachment device, the plurality of connectors being adapted to provide a gap between the first attachment device and the second attachment device.

20. The assembly according to claim 13, further comprising a single unit signal housing is operably connected to the first attachment device.

* * * * *